United States Patent [19]

Delisle et al.

[11] Patent Number: 4,975,703

[45] Date of Patent: Dec. 4, 1990

[54] HIGH RESOLUTION SHORT RANGE RADAR

[75] Inventors: Gilles Y. Delisle; Marcel Pelletier; Michel Lecours; John Ahern, all of Ste. Foy, Canada

[73] Assignee: Lab-Volt (Quebec) Ltee/Ltd., Ste. Foy, Canada

[21] Appl. No.: 277,655

[22] Filed: Nov. 29, 1988

Related U.S. Application Data

[63] Continuation-in-part of Ser. No. 160,357, Feb. 25, 1988, abandoned.

[51] Int. Cl.$^5$ ............................................. G01S 13/00
[52] U.S. Cl. ...................................... 342/21; 342/175; 434/2
[58] Field of Search ................. 342/21, 175, 94; 434/2

[56] References Cited

U.S. PATENT DOCUMENTS

| | | |
|---|---|---|
| 3,298,024 | 4/1965 | Bohm . |
| 3,739,392 | 6/1973 | Ross et al. . |
| 3,750,025 | 7/1973 | Ross . |
| 3,934,253 | 1/1976 | Wiedemann et al. . |
| 4,126,860 | 11/1978 | Sullivan et al. . |
| 4,150,375 | 4/1979 | Ross et al. . |
| 4,357,610 | 11/1982 | Kingston et al. . |
| 4,743,906 | 5/1988 | Fullerton . |

OTHER PUBLICATIONS

Hewlett Packard Manual-Measurement Computation, Systems (1986) pp. 420, 421, 430 and 431.
M. I. Skolnik, "Introduction to Radar Systems", McGraw-Hill, 1980, pp. 101–119.

Primary Examiner—Thomas H. Tarcza
Assistant Examiner—Mark Hellner

[57] ABSTRACT

A short range, high resolution, radar system of particular use in training radar operators. The system transmits very short pulses of a radio-frequency (RF) signal at a very high pulse repetition frequency, $PRF_o$. A signal pre-processor samples a received baseband radar signal and generates a time-expanded signal which is a replica of the real received radar signal, but with a much lower nominal pulse repetition frequency, $PRF_n$. The signal pre-processor includes a sampling circuit which receives the baseband signal, and a timing circuit which controls the sampling circuit. The timing circuit operates by causing samples of the baseband signal to be taken at progressively later portions of subsequent pulses. While the radar system is particularly useful in demonstrating radar principles in a classroom setting, it has other applications.

13 Claims, 5 Drawing Sheets

HIGH RESOLUTION SHORT RANGE RADAR

CROSS REFERENCE TO A RELATED APPLICATION

This application is a continuation-in-part of a prior United States patent application serial number 07/160,357 filed Feb. 25, 1988, now abandoned.

FIELD OF THE INVENTION

This invention relates generally to the field of radar systems, and particularly to a high resolution, wideband, short range, pulse radar wherein bandwidth reduction for signal processing is achieved through repetitive sampling. It is primarily intended for use in teaching and demonstrating radar principles.

BACKGROUND OF THE INVENTION

Radar is an electronic device for the detection and location of objects. One of the most common types of radar, pulse radar, operates by transmitting pulses of electromagnetic energy and then detecting echoes caused by reflections from a remotely located object ("target"). By measuring the time between the transmission of the pulse and the detection of the echo, it is possible to determine the distance of the object from the radar transmitter. This information, when coupled with the orientation of the antenna which received the echo, can be used to determine the location of the object. The relative position of the object can then be displayed on a video terminal or other appropriate device.

Although the underlying principles of pulse radar are conceptually simple, actual systems require relatively complicated equipment involving sophisticated circuitry for radar signal processing. As with all technical equipment, and especially complicated equipment, training is a crucial part of preparing personnel to operate and maintain radar systems competently. It is preferable to provide such training on an individualized basis, in the field, with actual radar equipment and with real targets. More realistically, field training on actual radar equipment and with real targets is frequently not possible and classroom training is the only alternative. Still, to provide the most effective training in the classroom environment, it is important to offer individualized training and to simulate real life conditions as closely as possible.

Conventional pulse radar systems, however, have not been well-suited for classroom training. First of all, duplicating a full-scale conventional pulse radar system for teaching purposes is expensive. Secondly, full-scale radar systems are incapable of operation at the close ranges and high resolutions compatible with the dimensions of a normal classroom, so that even when such systems are available, a student must observe targets which are located some distance away from the classroom. As a practical matter then, the student using such a radar has no control over the targets observed. He cannot easily arrange a configuration of targets to see how that affects the radar pattern; he cannot alter the orientation of the target to observe how that affects the radar signal; and he cannot easily compare selected target cross-sections with each other. In short, the versatility and value of a full-scale conventional radar as a classroom learning tool is quite limited.

Finally, a conventional pulse radar transmits high energy levels which are hazardous to humans. Predictably, the level of hazard is magnified in proportion to the number of systems operating at a given location. Consequently, to avoid risking injury to human life, it is essential to severely limit the number of systems concurrently operating in the classroom. With this limitation, individualized, hands-on training using conventional pulse radar becomes impractical.

One alternative to using a conventional pulse radar for training purposes is a computer simulator. Given the low cost of microcomputers, such systems are relatively inexpensive. Target placement and movement are merely programming options that are well within the control of the student. And since such systems transmit no actual radar signals, their use does not present a safety hazard. On the other hand, computer simulators sometimes do not offer the desired realism. Although it is possible to improve the sense of realism by using a more powerful computer, the system then becomes economically unattractive.

A desirable alternative would be to use a actual radar system that has a range and resolution within the scale of a typical training laboratory. With such a system, the student could observe scaled models of targets which are placed within and moved about the laboratory. Such a system would offer the realism of a conventional radar system, as well as the advantages of providing complete control over the selection and placement of targets. Moreover, since it is short range, the transmitted energy would be substantially less than for conventional pulse radar; therefore, the hazards normally associated with conventional high power pulse radars would be nonexistent.

In spite of the desirability of a short range, high resolution radar for training purposes, such systems historically have not been available due to significant technological and financial barriers to their development. Among the more serious problems have been those associated with the generation of the radar signal and the complexity and cost of the high bandwidth circuitry required in the receiver. To begin with, short range detection on the scale of a few meters with a resolution of a few centimeters requires sub-nanosecond duration pulses of radar frequency (RF) energy with corresponding RF bandwidths in the gigahertz (GHz) range. Conventional radar pulse modulators are not, in the present state of the art, adapted to the generation of such short RF pulse widths.

Even when such radars are adapted to process sub-nanosecond RF pulses, the required circuits are characteristically complex and very expensive. For example, such radar systems achieve target location for short duration RF pulses only through the use of specialized detection and range gating circuits; they do not permit actual sampling and recreation of the fine shape of the RF pulse. Because recreation and display of the fine pulse shape is sometimes critical in understanding how a radar operates, such systems are often not adequate for teaching how a conventional radar operates.

Therefore, it is a general object of this invention to provide a short range, high resolution pulse radar system.

Another object of this invention is to provide a short range, pulse radar system which is economically viable as an instructional device for individualized training of radar operators and other technical, engineering and scientific staff in a laboratory environment.

Yet another object of this invention is to provide a radar training system which can be used to detect and accurately locate model targets in a training laboratory environment.

A further object of this invention is to provide such a radar system which accurately reproduces the operation of a conventional long range, low resolution radar used in the field.

Other objects either are stated in the following description or will become evident in view of the description of the preferred embodiment.

SUMMARY OF THE INVENTION

In accordance with these objectives, the invention is a radar signal pre-processor which processes short duration radio frequency (RF) pulses received at an actual pulse repetition frequency, $PRF_o$. A slower-than-real-time, repetitive sampling technique is used to sample the received pulses in order to reconstruct a time-averaged replica of the fine shape of the received RF pulses. Pulse replicas are produced at a nominal pulse repetition frequency, $PRF_n$, which is much less than the actual pulse repetition frequency, $PRF_o$. The replicas are also provided on an expanded time scale, so that they can then be further processed signal processing by low bandwidth circuits.

More particularly, in accordance with the invention, a radar system transmits sub-nanosecond RF pulses having a bandwidth in excess of one GHz, to enable resolution on the order of a few centimeters. Transmitted RF pulses reflected by targets are returned to the radar as pulses in a received signal, which is demodulated to produce a baseband signal. The baseband signal is then fed to a signal pre-processor. The pre-processor repetitively samples the baseband signal in such a way that progressively later portions of successive pulses are sampled. By holding the sampled voltage between samples, the signal pre-processor generates an output which is replica of the baseband signal, but on a greatly expanded time scale. Thus, when a target is within the range of the radar, this sampled waveform represents a time-expanded replica of the fine shape (or envelope) of the RF pulses returned from the target.

As a result of this invention, the bandwidth required for the circuits which further process the baseband signal is substantially reduced. These circuits thus become relatively inexpensive to provide, and even digital processing of the sampled baseband waveform is easily accomplished.

For example, consider a system where the transmitted signal consists of one nanosecond duration RF pulses occurring every 5 microseconds ($\mu$sec), so that the $PRF_o$ of the received baseband signal is equal to 200 kilohertz (kHz). In this system the baseband signal is sampled once for each $PRF_o$, that is approximately every 5 $\mu$sec, but the sampling window shifts by 12 picoseconds (ps) each time a sample is taken. The range of the radar is set such that 1024 samples need to be taken in this fashion before the complete desired range is sampled. The nominal $PRF_n$ of the time-expanded replica will be only about 200 Hz. About eighty-three samples of each time-expanded replica pulse are available, with the samples spaced 5 $\mu$sec plus 12 ps apart. A time expansion factor, and hence a bandwidth reduction factor, of about $4 \times 10^5$ thus results with this arrangement.

Although this invention has immediate applications in connection with classroom radar training, its usefulness is not limited to those applications. For example, the invention has many other important applications in connection with high precision landing systems, docking systems, radar guidance systems for use in transportation, and non-destructive testing of non-metallic materials.

BRIEF DESCRIPTION OF THE DRAWINGS

The above and further advantages of the invention may be better understood by referring to the following description in conjunction with the accompanying drawings, in which.

DETAILED DESCRIPTION OF A PREFERRED EMBODIMENT

Figure 1:
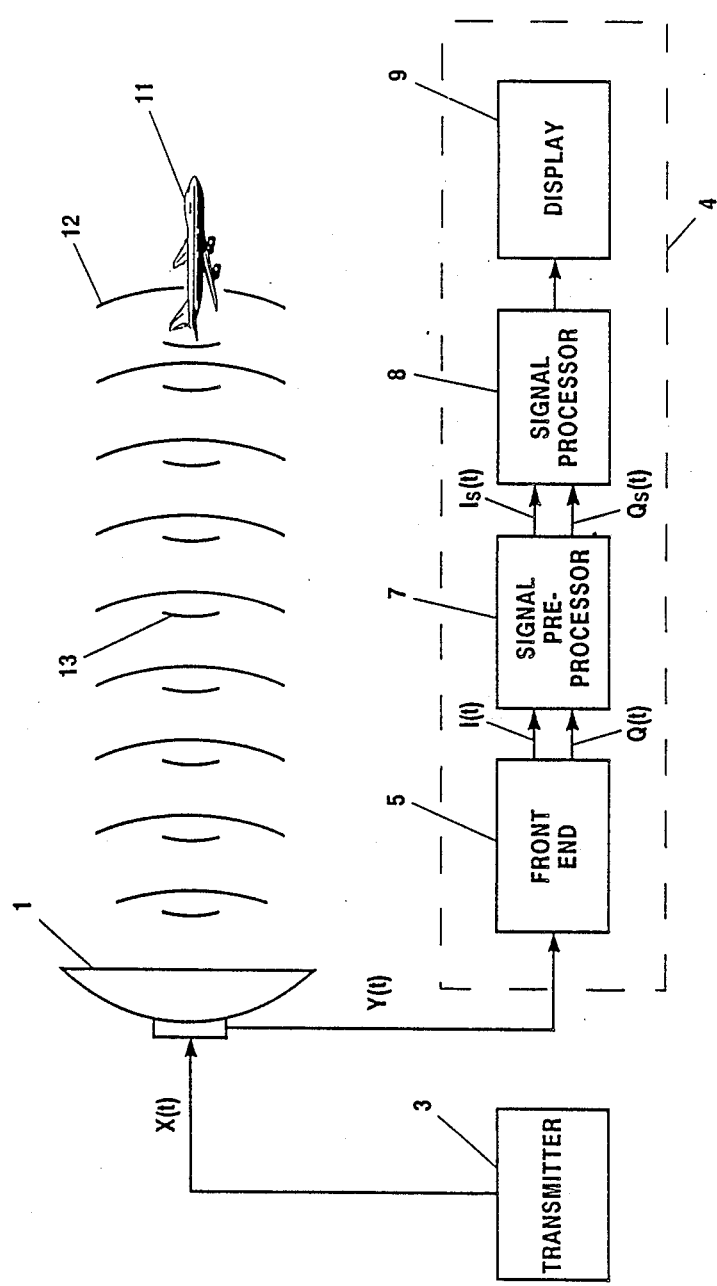
FIG. 1 is a block diagram of a short range, high resolution radar system constructed in accordance with the invention.

FIG. 1 illustrates one example of a short range, high resolution, radio frequency (RF) pulse radar system according to the invention. The radar system comprises a rotating radar antenna 1 which serves as both a transmitting and a receiving antenna for radar signals. A transmitter 3 and a radar receiver 4 are connected to the antenna 1. The transmitter 3 generates a periodic, pulsed, RF electrical signal X(t) which is propagated from the antenna 1 as a transmitted electromagnetic wave 12. The transmitted wave 12 reflects off a target 11, and a portion of the reflection returns to the antenna 1 as a reflected electromagnetic wave 13. In turn, this causes antenna 1 to send a corresponding received electrical signal Y(t) to the receiver 4. The received signal Y(t) thus consists of return pulses having the same period as the transmitted signal. Receiver 4 then extracts relevant information present in the received signal Y(t) to present a radar display to an operator.

In the receiver 4, a front end circuit 5 demodulates the received signal to produce a baseband signal which also has a period equal to that of the transmitted signal. The received signal Y(t) is processed by the front end circuit 5 in a conventional manner, well known to those skilled in the art. Specifically, front end circuit 5 employs coherent detection to demodulate the received signal Y(t), and thus in actuality produces the baseband signal as two separate signals which comprise an in-phase component and a quadrature component. As is well known, this can be accomplished by feeding the received signal Y(t) into two RF mixers which are also fed by two local oscillator signals having the same frequency as the carrier frequency of the received signal. The two local oscillator signals are identical except for a 90° phase difference. This process yields the two baseband signals as an in-phase component baseband signal, I(t), and a quadrature component baseband signal, Q(t).

As will be explained below in more detail, a signal pre-processor 7 then generates time-expanded replicas of the baseband signals by means of a repetitive sampling technique. Although the time-expanded baseband signal is periodic, it has a period which is much less than that of the baseband signal.

Finally, the time-expanded signals are then fed to a radar signal processor 8 and display circuitry 9 to produce the desired visual display.

Pre-processor 7 actually operates by separately processing each component baseband signal, I(t) and Q(t). The circuitry used for processing each signal is identical, however, so that in the following description we focus on how the in-phase component of the baseband signal I(t) is operated on to produce an in-phase component, time-expanded, sampled signal $I_s(t)$, with the understanding that the signal pre-processor 7 contains duplicate circuitry that processes the quadrature component baseband signal Q(t) in the same manner to produce a quadrature component sampled signal, $Q_s(t)$.

More particularly now, the signal pre-processor 7 greatly expands the time-scale of the baseband signal I(t) and thus reduces the bandwidth required for subsequent processing in the following manner. Pre-processor 7 preferably takes a single sample of each of a number of pulses in the baseband signal I(t). For example, a first sample is taken at a point in time which corresponds to the earliest expected return of a first transmitted pulse. As subsequent pulse repetitions are received in the baseband waveform, the pre-processor 7 also takes a single sample. However, these subsequent samples are taken at a progressively later segment of the corresponding pulse.

Thus, as the sampling process progresses, the sample window incrementally moves across the waveform of the baseband signal until enough pulses have been sampled so that the nominal range over which the operator wishes to observe targets has been completely sampled. This will occur after some integral number, $N_o$, of pulse have been sampled. At that point, the sample window is moved back to the initial point in the baseband waveform and the sequence is repeated.

The sample values are held between sample times, to generate the sampled baseband signal, $I_s(t)$, which is a replica of the average received RF pulses, but on a greatly magnified time scale. Thus, if the RF pulses are transmitted at a repetition frequency of $PRF_o$, the pulse repetition frequency of $I_s(t)$, referred to as the nominal received pulse repetition frequency, $PRF_n$, will be quite a bit less, such that $PRF_n = PRF_o/N_o$. In other words, the sampled signal $I_s(t)$ represents a time-expanded envelope of the received baseband signal I(t).

Figure 2:
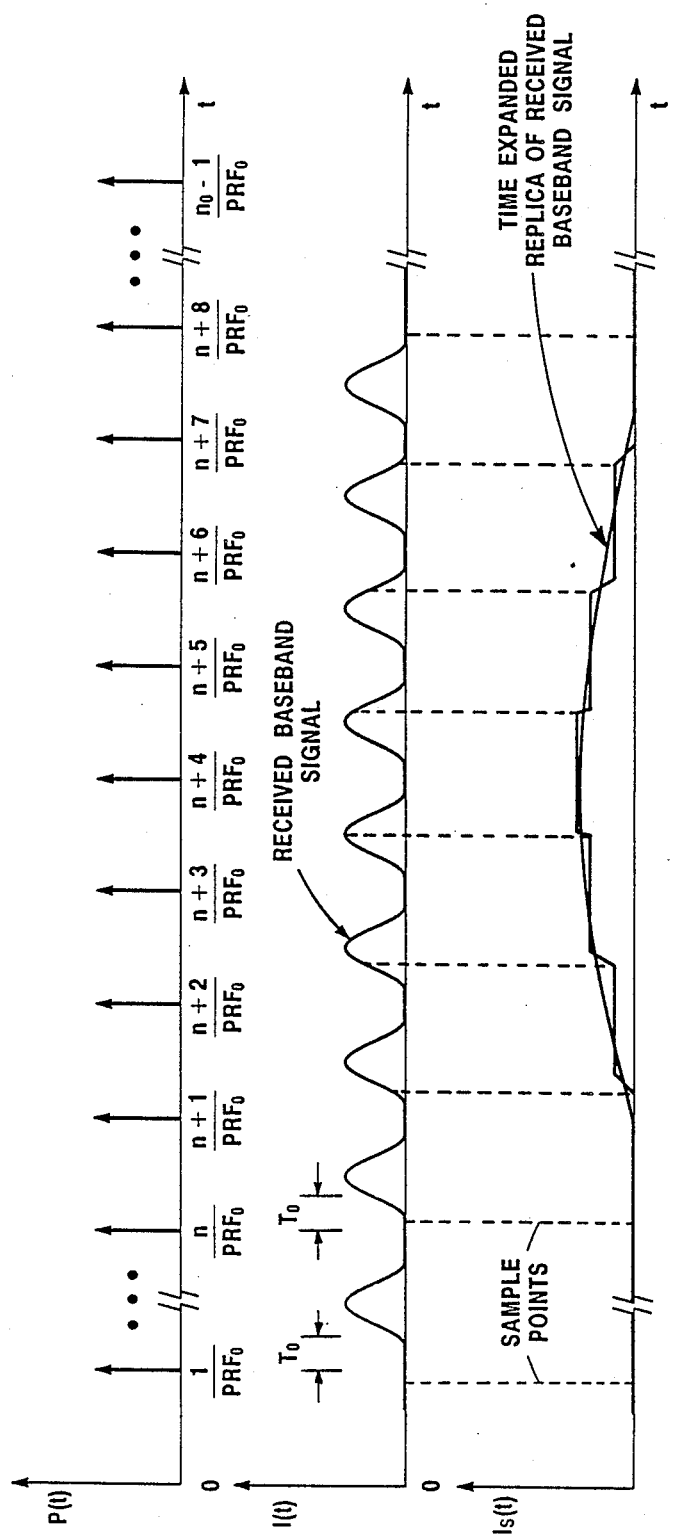
FIG. 2 is a timing diagram indicating how a time-expanded replica of the average envelope of a received signal is obtained.

This process can be further understood by referring to FIG. 1 together with the timing diagram of FIG. 2, which was drawn not necessarily to scale for clarity. In FIG. 2, a portion of the transmitted signal X(t) is shown as a train of narrow pulses (impulses) spaced in time by $1/PRF_o$. As in a conventional radar, at some point in time, $T_0$ seconds after an initial pulse of the transmitted signal X(t) occurs, the pulse is reflected by the target 11 and returned as a pulse in the baseband signal I(t). The exact duration of $T_0$ depends upon the propagation time for a pulse to travel from the antenna 1 to the target 11 and to return. Subsequent transmitted pulses also cause subsequent pulses in the baseband signal I(t) to occur.

However, unlike a conventional radar, only one sample of each return pulse in I(t) is taken. The sample and hold points, depicted by the vertical dashed lines in FIG. 2, occur at progressively later points relative to the beginning of each pulse. The output of this sample and holding process is the time-expanded replica, $I_s(t)$.

The length of time shown in FIG. 2 corresponds to the time it takes to transmit the appropriate number of RF pulses, $N_o$, which must be transmitted before a display of the nominal range over which the operator wishes to look can be constructed. Thus, unlike a conventional, real-time, radar system where the range displayable is proportional to the reciprocal of the pulse repetition frequency, or $1/PRF_o$, and that display can be updated every $1/PRF_o$ seconds, a time-expanded radar system in accordance with the invention, while also having a displayable range proportional to $1/PRF_o$, cannot update that display until $1/PRF_n$ (i.e., $N_o/PRF_o$) seconds have elapsed.

Figure 3:
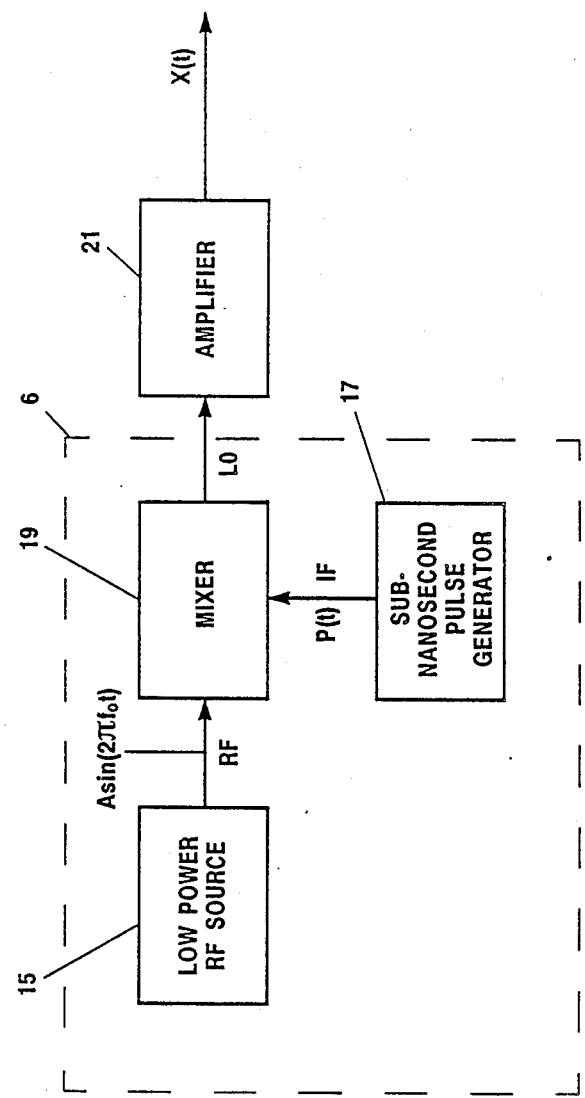
FIG. 3 is a block diagram of a transmitter circuit used to generate a radar signal in connection with the invention.

To achieve a resolution on the order of a centimeter with an RF pulse radar necessitates using an transmitted signal, X(t), having pulse widths in the nanosecond range. Pulses of such short duration are achieved using the circuitry illustrated in FIG. 3. In the particular embodiment shown there, an RF pulse signal source 6 within the transmitter 3 generates a pulse-modulated RF signal which has a pulse width, $\tau$, on the order of 1 nanosecond and an RF frequency of approximately ten GHz. As shown, a low-power RF source 15 provides an RF signal, $\sin(2\pi f_0 t)$, and a sub-nanosecond pulse generator 17 provides a pulse train, P(t), of one nanosecond duration pulses at a repetition frequency of $PRF_o$. A mixer 19 combines these two signals to generate a pulse-modulated sine wave that is fed to an amplifier 21. Amplifier 21 in turn produces the periodic signal X(t) that is transmitted from the antenna 1. The mixer 19 has sufficient input-to-output isolation so that essentially no RF signals pass through it during the periods when the P(t) signal equals zero volts. The mixer 19 also has an intermediate frequency (IF) bandwidth in excess of one GHz.

In the present embodiment, the pulse repetition frequency $PRF_o$ is approximately 200 kHz, which represents a signal period of about 5 $\mu$sec. This, of course, can be varied depending upon the operational requirements of the radar system.

Figure 4:
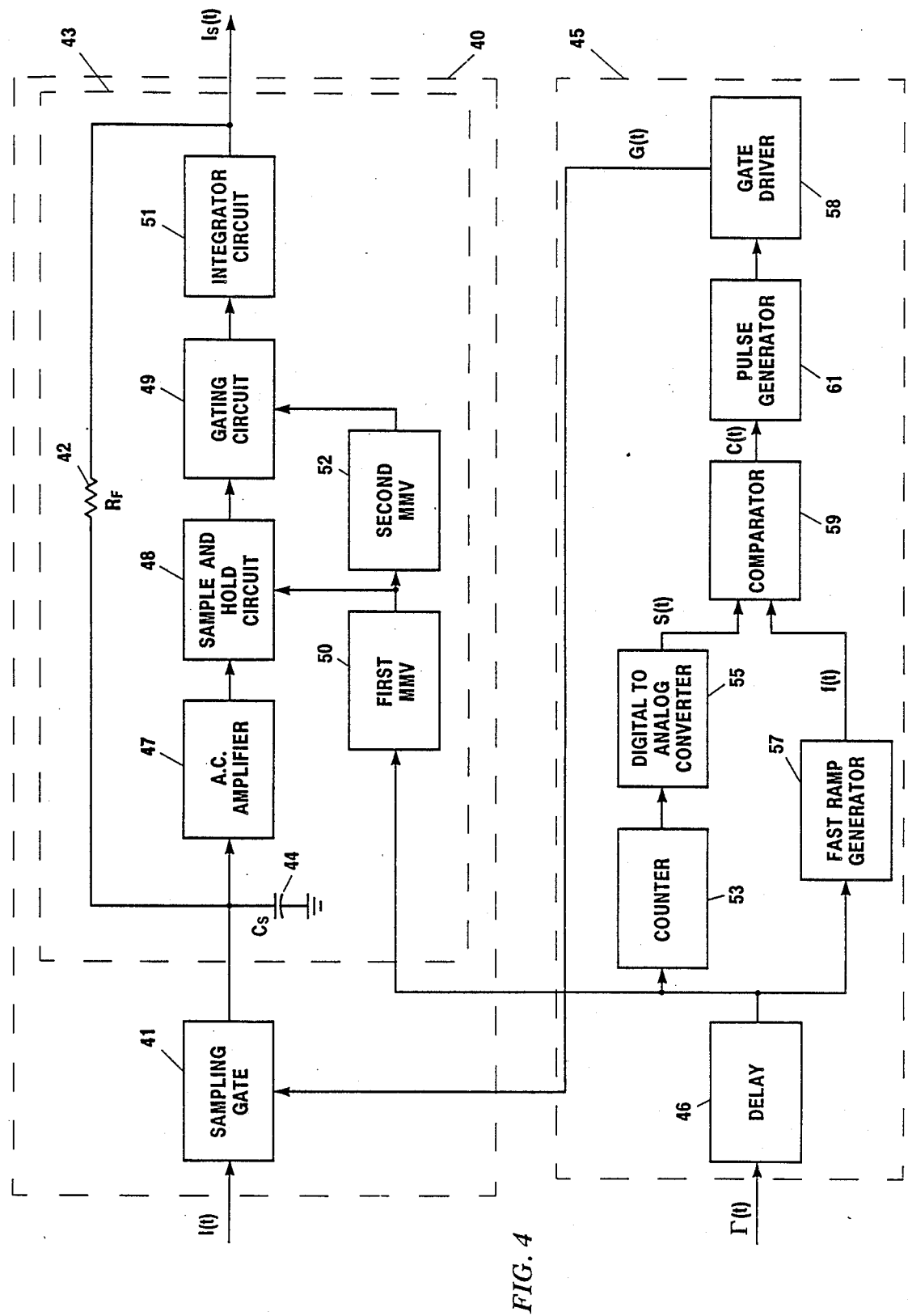
FIG. 4 is a block diagram of a signal pre-processor which embodies the invention.

The pre-processor 7, illustrated in more detail in FIG. 4, includes a sampling circuit 40 which is controlled by a timing circuit 45. The sampling circuit 40 includes a sampling gate 41 which receives the baseband signal I(t), and a storage unit 43, which receives the output from the sampling gate 41. During the occurrence of each sampling window, the I(t) signal is passed through the sampling gate 41 to the storage unit 43. Between sampling windows, storage unit 43 maintains the voltage seen during the prior sampling window at its output. Storage unit 43 provides the time-expanded baseband signal $I_s(t)$ at its output.

In the embodiment shown, the storage unit 43 comprises a capacitor 44 which receives the output from the sampling gate 41, an alternating current (a.c.) amplifier 47 connected to the capacitor 44, a sample-and-hold circuit 48 which monitors the output of the a.c. amplifier 47, an integrator circuit 51 which generates the output $I_s(t)$ of the signal pre-processor 7, and a gating circuit 49 which applies an output from the sample-and-hold circuit 48 to the integrator circuit 51 for a predetermined length of time. The timing of the sample-and-hold circuit 48 and of the gating circuit 49 are controlled by a first monostable multivibrator 50 and a second monostable multivibrator 52, respectively. Finally, the output $I_s(t)$ from the integrator circuit 51 is fed back to the capacitor 44 ($C_s$) through a feedback resistor 42 ($R_f$).

The storage unit 43 operates as follows. During the sampling window, the sampling gate 41 opens and thus produces a change in the voltage across the capacitor 44, urging it to the level of the I(t) signal. This voltage change is amplified by the a.c. amplifier 47 and passed to the sample-and-hold circuit 48 which generates and holds an indicator voltage that is proportional to the amplitude of the voltage change. After the indicator voltage has been established, the gating circuit 49 applies this indicator voltage to the integrator circuit 51 for a fixed integration time, $T_2$. In response to this, the output, $I_s(t)$, of the integrator circuit 51 ramps to a level where it remains until changed by the occurrence of the next sampling window and hence the next sample taken of the I(t) signal. The net change in the output level of the storage unit 43 is thus made proportional to the product of the indicator voltage and the integration time $T_2$, as a direct consequence of the ramping. Moreover, the gain of the storage unit 43 is set so that the $I_s(t)$ signal ramps to a level equal to approximately the average of the I(t) signal during the sample window.

The feedback through resistor 42 causes the voltage across the capacitor 44 to track the output voltage $I_s(t)$ after each sample is taken. In other words, this feedback provides a reference voltage against which the next sample of the I(t) signal is compared. The storage unit 43 thus senses any difference between the current sample of the I(t) signal and the output voltage level generated by the preceding sample. Then, as previously described, it modifies its output $I_s(t)$ accordingly by ramping to a new level corresponding to the difference sensed, and remains at that new level until again modified in response to another sample. Thus, the output voltage waveform $I_s(t)$ comprises a sequence of voltage levels joined by voltage ramps. An advantage of using the output level as the reference against which the sampled I(t) signal is compared is the cancellation of any possible voltage drift from one sample to the next.

In the embodiment described herein, the duration of the sampling window, $\delta$, is so small that the capacitor 44 does not fully charge during the available sampling time. For instance, at the beginning of the sampling window, the voltage across capacitor 44 is approximately equal to the output voltage level, $I_s(t)$, established from the preceding sample. During the sampling window, the voltage across the capacitor moves toward the new sampled voltage I(t). However, in the embodiment we have constructed, only approximately 10% of the difference between $I_s(t)$ and the average value of I(t) is observed before the sampling window ends. The gain of the storage unit 43 is adjusted to compensate for this, by amplifying the sensed voltage difference occurring at the capacitor 44 by a factor of approximately ten. This assures that the resulting $I_s(t)$ waveform accurately tracks the baseband signal I(t).

Timing circuit 45 generates the extremely narrow pulses of duration $\delta$ which control the sampling gate 41. It also generates a time delay increment, $\sigma$, which is the amount of time added to increment the point at which the sampling window begins for each subsequent sample.

The delay increment, $\sigma$, is selected depending upon the time resolution desired for $I_s(t)$. The shorter the increment $\sigma$, the greater the number of samples are available; however, the longer it will also take to produce the time-averaged replica. In most circumstances, the increment $\sigma$ should not be longer than one-half the pulse duration, $\tau$, so that at least one sample of each pulse is available.

As shown in FIG. 4, on the input side of the timing circuit 45 a delay circuit 46 receives a timing signal $\Gamma(t)$. Timing signal $\Gamma(t)$ has a pulse repetition period of $1/PRF_o$, and is phased synchronized with the transmitted RF signal. Connected to the output of delay circuit 46 is a counter 53 whose contents are applied to a digital-to-analog converter 55. The output of the converter 55 is thus a staircase voltage, S(t). Also connected to the delay circuit 46 is a fast ramp generator 57 which produces an ramp output signal, f(t). Both S(t) and f(t) are then fed to a comparator 59 that drives a second pulse generator 61. Second pulse generator 61 in turn drives a gate driver 58 to produce a control signal G(t) which controls the sampling gate 41.

Figure 5:
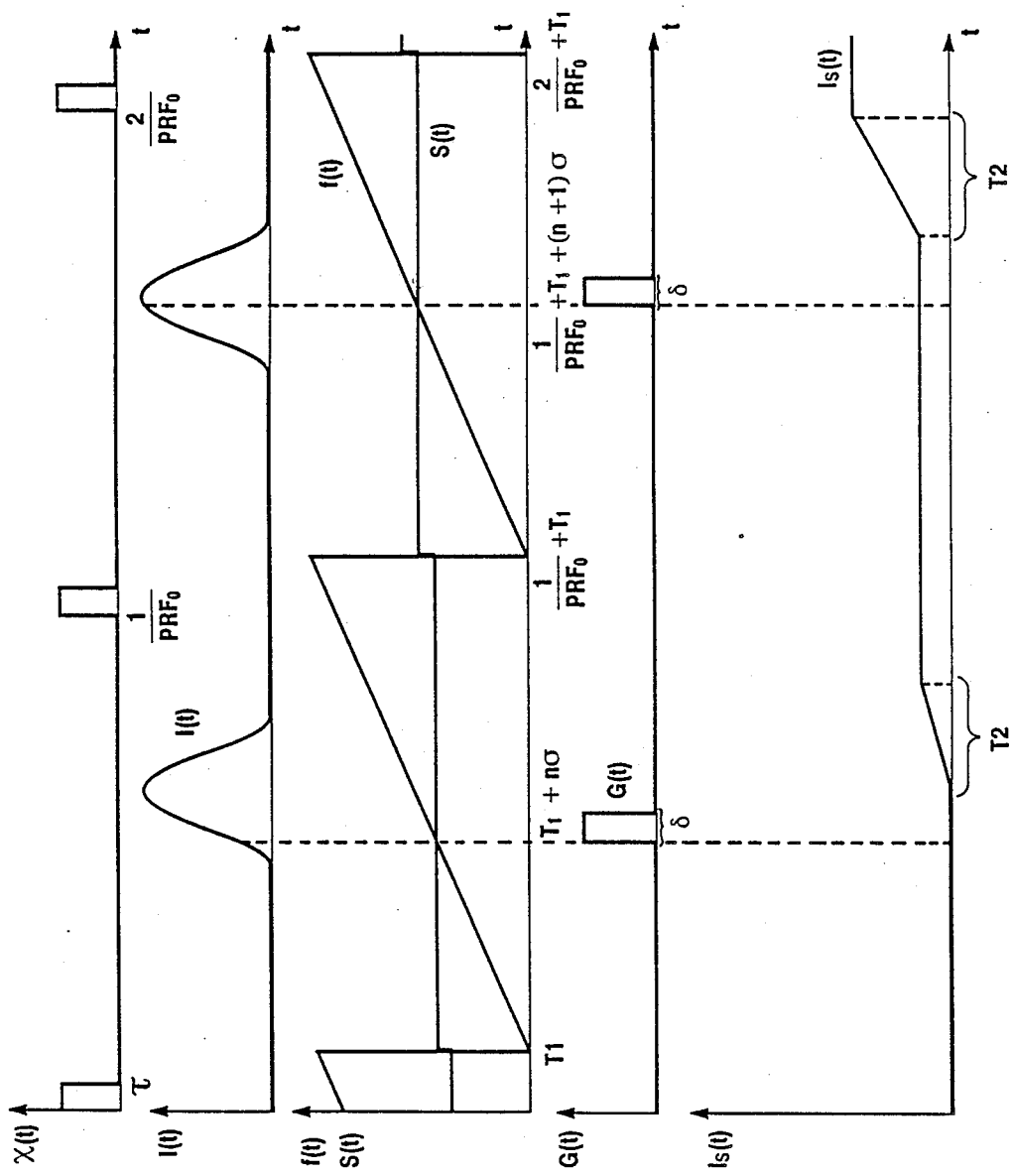
FIG. 5 illustrates the signal timing for some of the signals generated in the embodiment of the short range, high resolution pulse radar system depicted in the above figures.

The operation of the components of the pre-processor 7 can be further understood by referring to the timing diagram in FIG. 5 together with FIG. 4. It should be noted that the waveforms shown in FIG. 5 are idealized for purposes of this description, and that both the amplitudes and timing are not necessarily to scale.

As previously mentioned, the envelope of the periodic transmitted signal X(t) is derived from the pulse train P(t) of duration $\tau$ spaced by $1/PRF_o$ in time. At predetermined time for each period in the received baseband signal, I(t), the timing circuit 45 uses the control signal G(t) to command the sampling gate 41 to take a single sample of I(t) signal, using a sample window of duration $\delta$. During the first period, the timing circuit 45 takes this sample at a time $T_1$ after the initiation of the transmitted RF pulse. $T_1$ is a variable delay time which can be controlled by the operator, and which is set according to the range the operator wishes to observe on the display 9. During each subsequent period of the I(t) signal, the timing circuit 45 delays the sample window by the predetermined amount, $\sigma$. Thus, the samples of I(t) are taken at times $T_1+(n-1)*\sigma$ after the initiation of the corresponding RF pulse, where "n" is the number of a period. In other words, the time between samples is equal to $(1/PRF_o)+\sigma$. After a preselected number of samples, $N_o$, have been taken, the timing circuit 45 is reset so that the next sample occurs at a time $T_1$ after the initiation of the next RF pulse, and the above-described sampling algorithm is repeated.

The timing circuit 45 operates in particular to generate the control signal G(t) as follows. The delay circuit 46 delays the $\Gamma(t)$ signal by an amount $T_1$, which is variable and may be changed by the system operator for the reason already mentioned. The counter 53 monitors this delayed signal $\Gamma(t-T_1)$, and generates an output which increments each time a new period begins, that is, each time a new pulse is expected. In response, converter 55 generates the reference voltage S(t). Reference voltage S(t) increases by a predetermined amount each time the output of the counter 53 is incremented. After the counter 53 reaches a predetermined point corresponding to the time when the $N_o-1$'th pulse is to be sampled, the counter 53 is reset to zero, and S(t) drops back down to an initial minimum value. The counting process then repeats. The resulting S(t) waveform resembles a staircase as illustrated in FIG. 5.

The fast ramp generator 57 also monitors the delayed signal $\Gamma(t-T_1)$. At the beginning of each period, the fast ramp generator 57 produces a voltage ramp which rises at a substantially uniform rate from a voltage of approximately zero, to produce the signal f(t) as illustrated.

The comparator 59 then compares the two signals, f(t) and S(t) and produces an indicator of the time at which f(t) becomes equal to S(t). When this indicator occurs, the second pulse generator 61 produces a pulse of duration δ, which then passes through the gate driver 58 to generate the control signal G(t) used to drive the sampling gate 41. During the next cycle, the voltage from the converter 55 is incremented by a fixed amount, which has the effect of causing an additional delay of $\sigma$ in the time at which the gating pulse occurs after the beginning of the next period.

By varying $T_1$, the point at which the sampling process begins, the section of the baseband signal I(t) which is examined, and hence the displayed range can be adjusted as desired. In addition, by properly selecting other circuit parameters it is possible to adjust the rate of increase of the ramp voltage f(t), thereby to precisely controlling the amount of delay, $\sigma$, which determines how far the sampling window moves from one pulse repetition period to the next.

FIG. 5 also illustrates how $I_s(t)$, which is generated by the integrator circuit 51, ramps to a level over the integration time period $T_2$ where it remains until changed by the occurrence of the next sampling window.

In the particular embodiment described herein, $\sigma$ is set to approximately 12 picoseconds and the duration of the sample window, δ, is about 200 picoseconds. Recall that the physical pulse repetition rate, $PRF_o$, was set to 200 kHz. In addition, the number of samples, $N_o$, which comprise each sampling sequence is 1024. With this selection of parameters, it thus takes about 5 milliseconds (ms) to completely reconstruct one pulse repetition interval, duration $1/PRF_n$, of the sampled signal, $I_s(t)$. On the average, the signal pre-processor 7 thus also provides approximately eighty-three samples of the time-expanded replica of the return pulse. Using both the inphase and quadrature components, $I_s(t)$ and $Q_s(t)$, to reconstruct the amplitude modulation and phase information in the received signal, the resulting resolution within a ten meter range is about 12 centimeters with a positional accuracy of less than 1 centimeter.

The display 9 presents information contained in the $I_s(t)$ and $Q_s(t)$ signals by using conventional circuitry well-known to persons skilled in the art. For example, if directional information is not important, the display 9 may simply comprise an A-scope (amplitude display). On the other hand, if directional as well as target motion information is desired, a PPI (Plan Position Indicator) coupled with an X-Y display would be appropriate and an MTI (Moving Target Indicator) signal processor could also be included. In all cases, due to the inventions described herein, the bandwidths of circuitry needed in the display 9 are well below one GHz. Thus, such circuitry is readily available and considerably less expensive than broad bandwidth circuitry capable of processing gigahertz signals.

The foregoing description has been limited to a specific embodiment of this invention. For example, the in-phase and quadrature sampling technique need not be used, although the resulting required bandwidths will be larger. Clearly, other pulse repetition intervals, pulse durations, and resulting range and resolutions can be used. Bandpass sampling can be used to generate the time-expanded sampled baseband signal directly from the RF signal. Furthermore, other signal processing techniques can be used to obtain a similar type of time-expanded baseband signal.

It is apparent, then, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters patent of the United States is:

1. A method for pre-processing a received radar signal to achieve high resolution and short range radar operation, where the received signal includes short duration radio frequency (RF) pulses at an actual pulse repetition frequency of $PRF_o$, the method of pre-processing comprising:
    A. sampling the received signal during each period of duration $1/PRF_o$, with an incremental delay added to the time between successive samples, so that for successive periods, the samples are taken at successively later times relative to the beginning of the period; and
    B. producing a time-expanded output signal from the values of successive samples, the time-expanded signal representing a replica of the envelope of the received signal.

2. A method as in claim 1 wherein the step of sampling begins sampling at a time, $T_1$, after the initiation of a first RF pulse, and successive samples occur thereafter at times which are separated by a time interval equal to $(1/PRF_o)$ plus a very short constant delay, $\sigma$, the delay $\sigma$ being selected to provide the desired detail in the time-expanded signal.

3. A method as in claim 1 wherein the step of sampling samples a baseband signal and additionally including the step of:
    C. generating a baseband signal from the received signal.

4. A method as in claim 1 wherein the step of producing comprises:
    D. sensing a difference between the most recent sample of the received signal and the preceding sample;
    E. storing an indicator corresponding to this sensed difference; and
    F. applying the stored indicator to an integrator circuit to yield the time-expanded output signal.

5. A signal pre-processor for use in a high resolution, short range pulse radar system, wherein a pulse radio frequency (RF) signal of duration $\tau$ is transmitted at a pulse repetition frequency of $PRF_o$, and a received radar signal is demodulated to produce a baseband signal, the signal pre-processor comprising:
    A. a sampling circuit which samples the baseband signal using a sample window of duration δ in response to a control signal, where δ is less than $\tau$, and generates an output signal which corresponds to the sampled signal; and
    B. a timing circuit which generates the control signal, wherein the control signal causes the sampling circuit to sample the baseband signal at a first time $T_1$ after the initiation of a first pulse in the RF signal, and to sample the baseband signal at a plurality of successive times thereafter which are separated by a time interval equal to $(1/PRF_o)$ plus a constant delay, $\sigma$, which is less than $\tau$, so that the output signal generated by the sampling circuit is a time-expanded envelope of the baseband signal.

6. An apparatus as in claim 5, wherein the sampling circuit comprises:
  C. a sampling gate which samples the baseband signal; and
  D. a storage unit, connected to the sampling gate, wherein the storage unit generates the output signal.

7. A radar receiver comprising:
  A. a sampler, which samples a received pulse radar signal in response to a control signal, the received signal including short duration radio frequency (RF) pulses of duration $\tau$ at an actual pulse repetition frequency of $PRF_o$, and the sampler generating a sampled signal; and
  B. a timing circuit, which generates the control signal such that it causes the sampler to take at least one sample of the received signal during each period of duration ($1/PRF_o$ using a sample window of duration $\delta$, where $\delta$ is less than $\tau$,
  whereby the sampled signal generated by the sampler includes time-expanded replicas of the pulses in the received signal, the time-expanded replica pulses having a normal pulse repetition frequency of $PRF_n$, which is less than the actual pulse repetition frequency $PRF_o$.

8. Apparatus as in claim 7 wherein the timing circuit additionally comprises:
  i. a counter, which generates a staircase waveform having a value which increments by one during each period of duration $1/PRF_o$, and which is periodically reset after a predetermined number of such periods, the predetermined number of periods depending upon a desired range for the radar receiver;
  ii. a fast ramp generator, which generates a ramp waveform which monotonically increases from a minimum value to a maximum value during each period of duration $1/PRF_o$; and
  iii. a comparator, which compares the staircase waveform and the ramp waveform to generate the control signal.

9. A radar system for use in training radar operators in a classroom setting using model target, the radar having a spatial resolution on the order of a centimeter, comprising:
  A. a transmitter that periodically transmits sub-nanosecond duration radio-frequency (RF) pulses having a bandwidth in excess of one gigahertz (GHz), at an actual pulse repetition frequency of $PRF_o$;
  B. a radio frequency receiver that receives the sub-nanosecond RF pulses reflected by a particular target as periodic pulses in a received RF signal;
  C. means for demodulating the RF signal to produce a baseband signal; and
  D. a pre-processor that receives the baseband signal, the pre-processor comprising:
    i. a sampler that repetitively samples the baseband signal in such a way that progressively later samples represent progressively later portions of successive pulses reflected from the particular target; and
    ii. means for storing the value of samples in the time period between successive samples, so that when the particular target is within the range of the radar, the signal pre-processor generates an output signal which is a time-expanded replica of the fine shape of the RF pulses reflect by the particular target.

10. Apparatus as in claim 9 wherein the sampler additionally samples the baseband signal in response to a control signal, and the pre-processor additionally comprises:
  iii. a timing circuit, which generates the control signal, such that the sampler takes at least one sample of the baseband signal during each of a plurality of periods of duration $1/PRF_o$, and such that the sampler uses a sample window which is less than the duration of the sub-nanosecond pulses, and such that the output signal generated by the storing means includes time-expanded replicas of the received RF pulses having a nominal pulse repetition frequency of $PRF_n$, which is less than the actual pulse repetition frequency $PRF_o$.

11. Apparatus as in claim 10 wherein the timing circuit additionally comprises:
  i. a counter, which generates a staircase waveform having a value which increments by one during each period of duration $1/PRF_o$, and which is periodically reset after a predetermined number of such periods, the predetermined number of periods depending upon a desired range for the radar receiver;
  ii. a fast ramp generator, which generates a ramp waveform which monotonically increases from a minimum value to a maximum value during each period of duration $1/PRF_o$; and
  iii. a comparator, which compares the staircase waveform and the ramp waveform to generate the control signal.

12. Apparatus as in claim 9 wherein the sampler additionally samples the baseband signal in response to a control signal, and the pre-processor additionally comprises:
  iii. a timing circuit, which generates the control signal, such that the sampler takes at least one sample of the baseband signal during each of a plurality of periods of duration $1/PRF_o$, and such that the sampler uses a sample window which is less than the duration of the sub-nanosecond pulses, and such that the output signal generated by the storing means includes time-expanded replicas of the received RF pulses having a nominal pulse repetition frequency of $PRF_n$, which is equal to the actual pulse repetition frequency, $PRF_o$, divided by the predetermined number of periods.

13. A method as in claim 1 wherein the step of sampling further samples at a plurality of times during each period of duration $1/PRF_o$, and the incremental delay is added so that the time interval between each sample and the corresponding sample taken in the previous period increases.

* * * * *